(12) United States Patent
Eagleson, Sr. et al.

(10) Patent No.: US 12,400,179 B2
(45) Date of Patent: Aug. 26, 2025

(54) METHODS AND APPARATUS FOR LINKING PRE-PRINTED LABELS TO PRODUCT INFORMATION

(71) Applicants: David Eagleson, Sr., Severna Park, MD (US); Justin Charles Peterson, Windsor, MA (US)

(72) Inventors: David Eagleson, Sr., Severna Park, MD (US); Justin Charles Peterson, Windsor, MA (US)

( * ) Notice: Subject to any disclaimer, the term of this patent is extended or adjusted under 35 U.S.C. 154(b) by 0 days.

(21) Appl. No.: 17/403,841

(22) Filed: Aug. 16, 2021

(65) Prior Publication Data

US 2022/0318724 A1    Oct. 6, 2022

Related U.S. Application Data

(60) Provisional application No. 63/168,650, filed on Mar. 31, 2021.

(51) Int. Cl.
| | |
|---|---|
| *G06Q 10/087* | (2023.01) |
| *G06K 1/12* | (2006.01) |
| *G06K 7/14* | (2006.01) |
| *G06K 19/07* | (2006.01) |

(52) U.S. Cl.
CPC ........... *G06Q 10/087* (2013.01); *G06K 1/121* (2013.01); *G06K 7/1417* (2013.01); *G06K 19/0723* (2013.01)

(58) Field of Classification Search
CPC .............................. G06Q 10/087; G06K 1/121
See application file for complete search history.

(56) References Cited

U.S. PATENT DOCUMENTS

| | | | | |
|---|---|---|---|---|
| 6,952,281 | B1 * | 10/2005 | Irons | H04N 1/2166 |
| | | | | 358/1.15 |
| 7,766,240 | B1 * | 8/2010 | Grant | G06Q 10/08 |
| | | | | 283/79 |
| 2003/0080191 | A1 * | 5/2003 | Lubow | G06K 19/06056 |
| | | | | 235/462.01 |
| 2005/0074588 | A1 * | 4/2005 | Coburn | G09F 3/02 |
| | | | | 428/196 |
| 2006/0175401 | A1 * | 8/2006 | Roberts | G06Q 10/087 |
| | | | | 235/383 |
| 2017/0330194 | A1 * | 11/2017 | Gibbs | G06K 7/10366 |
| 2021/0208822 | A1 * | 7/2021 | Veenma | G06F 3/1206 |

FOREIGN PATENT DOCUMENTS

WO    WO-2014183162 A1 *  11/2014  ............. G06Q 10/08

\* cited by examiner

*Primary Examiner* — A. Hunter Wilder

(57) ABSTRACT

An apparatus for managing inventory is described. The apparatus includes a plurality of labels each having a unique pre-printed indicia. A printer prints machine-readable data corresponding to product information on one or more of the labels, such that the machine-readable data is printed on a same side of the label as the unique pre-printed indicia. An imaging device reads the machine-readable data and the unique pre-printed indicia on the label. A computing device includes software that associates the machine-readable data with the unique pre-printed indicia to create an association that is stored in a memory.

17 Claims, 6 Drawing Sheets

| SKU | SERIAL# | ASSOC. |
|---|---|---|
| KS944RUR | abc001 | 944abc001 |
| KS944RUR | abc002 | 944abc002 |
| KS944RUR | abc003 | 944abc003 |
| KS944RUR | abc004 | 944abc004 |
| | abc005 | |
| KS944RUR | abc006 | 944abc006 |
| KS944RUR | abc007 | 944abc007 |
| KS944RUR | abc008 | 944abc008 |

| SKU | SERIAL# | ASSOC. |
|---|---|---|
| | abc009 | |
| KS944RUR | abc010 | 944abc010 |
| KS944RUR | abc011 | 944abc011 |
| KS944RUR | abc012 | 944abc012 |
| KS944RUR | abc013 | 944abc013 |
| | abc014 | |
| KS944RUR | abc015 | 944abc015 |
| KS944RUR | abc016 | 944abc016 |

| QUERY: HOW MANY ITEMS ARE NOT IN THE DATABASE? | | | |
|---|---|---|---|
| abc005 | | | |
| abc009 | | | |
| abc014 | | | |
| TOTAL | 3 | | |

FIG. 5

METHODS AND APPARATUS FOR LINKING PRE-PRINTED LABELS TO PRODUCT INFORMATION

CROSS REFERENCE TO RELATED APPLICATION

The present application is related to and claims the benefit of priority under 35 U.S.C. § 119(e) from U.S. Provisional Application Ser. No. 63/168,650, filed Mar. 31, 2021, the entire contents of which are incorporated herein by reference.

TECHNICAL FIELD

The present invention relates to methods and apparatus to manage inventory.

BACKGROUND OF THE INVENTION

Generally, high value goods, such as electronic products include serial numbers that are used to manage and track inventory and for registering the product for warranty purposes. Low cost products, such as consumer packaged goods (CPG) are generally not serialized. The nature of low cost goods makes serializing them costly and burdensome. The present intention provides a low-cost method to serialize lower cost products for managing and tracking such products.

SUMMARY

In one aspect, the invention is embodied in a method. The method includes loading multiple labels each having a unique pre-printed indicia into a printer. Machine-readable data corresponding to product information is printed on at least one of the plurality of labels, such that the machine-readable data is printed on a same side of the least one label as the unique pre-printed indicia. The machine-readable data and the unique pre-printed indicia are read on the least one label with an imaging device coupled to a computing device. The machine-readable data is associated with the unique pre-printed indicia to create an association. The association is stored in a memory.

In one embodiment, the machine-readable data and the unique pre-printed indicia are read substantially simultaneously. In another embodiment, the machine-readable data and the unique pre-printed indicia are read sequentially.

In another embodiment, the method also includes attaching at least one of the labels to an individual product item. The method can also include managing the individual product item with the stored association of the machine-readable data and the unique pre-printed indicia. The method can also include determining an inventory status of the individual product item using the association.

In one embodiment, the memory includes a database. The machine-readable data can include a product identifier for the product. The unique pre-printed indicia can include a unique serial number. In one embodiment, the unique serial numbers of the plurality of labels can include sequential values. The method can also include reading both the lowest unique serial number and the highest unique serial number of the plurality of labels and inferring the remaining serial numbers of the plurality of labels.

In one embodiment, each of the plurality of labels further includes a radio frequency identification (RFID) circuit for storing the unique pre-printed indicia. The radio frequency identification (RFID) circuit includes one of a Near-Field Communication (NFC) circuit and an Ultra High Frequency (UHF) circuit.

In another aspect, the invention is embodied in an apparatus for managing inventory. The apparatus includes a plurality of labels each having a unique pre-printed indicia. A printer prints machine-readable data corresponding to product information on one or more of the labels, such that the machine-readable data is printed on a same side of the label as the unique pre-printed indicia. An imaging device reads the machine-readable data and the unique pre-printed indicia on the label. A computing device is coupled to the imaging device. The computing device includes software that associates the machine-readable data with the unique pre-printed indicia to create an association. A memory stores the association. The memory can be local to the computing device or remote, such as cloud storage.

In one embodiment, the imaging device reads the machine-readable data and the unique pre-printed indicia substantially simultaneously. Alternatively, the imaging device reads the machine-readable data and the unique pre-printed indicia sequentially. In one embodiment, the memory includes a database. In one embodiment, the machine-readable data includes an identifier for the product. The unique pre-printed indicia can include a unique serial number.

In one embodiment, each label can also include a radio frequency identification (RFID) circuit for storing the unique pre-printed indicia. The radio frequency identification (RFID) circuit can be a Near-Field Communication (NFC) circuit or an Ultra High Frequency (UHF) circuit. In one embodiment, each label is attached to an individual product item.

In another aspect, the invention is embodied in a system. The system includes a printer accepting a plurality of labels each having a unique pre-printed indicia. The printer prints machine-readable data corresponding to product information on at least one of the labels, such that the machine-readable data is printed on a same side of the label as the unique pre-printed indicia. An imager reads the machine-readable data and the unique pre-printed indicia on the label. A computer associates the machine-readable data with the unique pre-printed indicia to create an association. A memory stores the association.

BRIEF DESCRIPTION OF THE DRAWINGS

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

The above and further advantages of this invention may be better understood by referring to the following description in conjunction with the accompanying drawings, in which like numerals indicate like structural elements and features in various figures. Skilled artisans will appreciate that reference designators shown herein in parenthesis indicate components shown in a figure other than the one in discussion. For example, talking about a device (10) while discussing FIG. A would refer to an element, 10, shown in figure other than FIG. A.

FIG. 5. illustrates a database table according to the invention.

DESCRIPTION OF PREFERRED EMBODIMENTS

The following detailed description is merely illustrative in nature and is not intended to limit the invention or the application and uses of the invention. Furthermore, there is no intention to be bound by any express or implied theory presented in the preceding technical field, background, brief summary or the following detailed description.

Techniques and technologies may be described herein in terms of functional components and various processing steps. It should be appreciated that such components may be realized by any number of hardware components configured to perform the specified functions.

The following description may refer to elements or features being "connected" or "coupled" together. As used herein, unless expressly stated otherwise, "connected" means that one element/feature is directly joined to (or directly communicates with) another element/feature. Likewise, unless expressly stated otherwise, "coupled" means that one element/feature is directly or indirectly joined to (or directly or indirectly communicates with) another element/feature. The term "exemplary" is used in the sense of "example, instance, or illustration" rather than "model," or "deserving imitation."

Technologies and concepts discussed herein relate to apparatus and methods to manage inventory. The apparatus includes a plurality of labels each having a unique pre-printed indicia. Each label having the pre-printed indicia can also include a radio-frequency identification (RFID) circuit included thereon. The RFID circuit can be programmed to include information corresponding to the unique pre-printed indicia.

A printer prints machine-readable data corresponding to product information on the labels, such that the machine-readable data is printed on a same side of the label as the unique pre-printed indicia. An imaging device reads the machine-readable data and the unique pre-printed indicia on the label. A computing device is coupled to the imaging device. The computing device includes software that associates the machine-readable data with the unique pre-printed indicia to create an association. A memory stores the association. The memory can be local to the computing device or remote, such as cloud storage.

Figure 1:
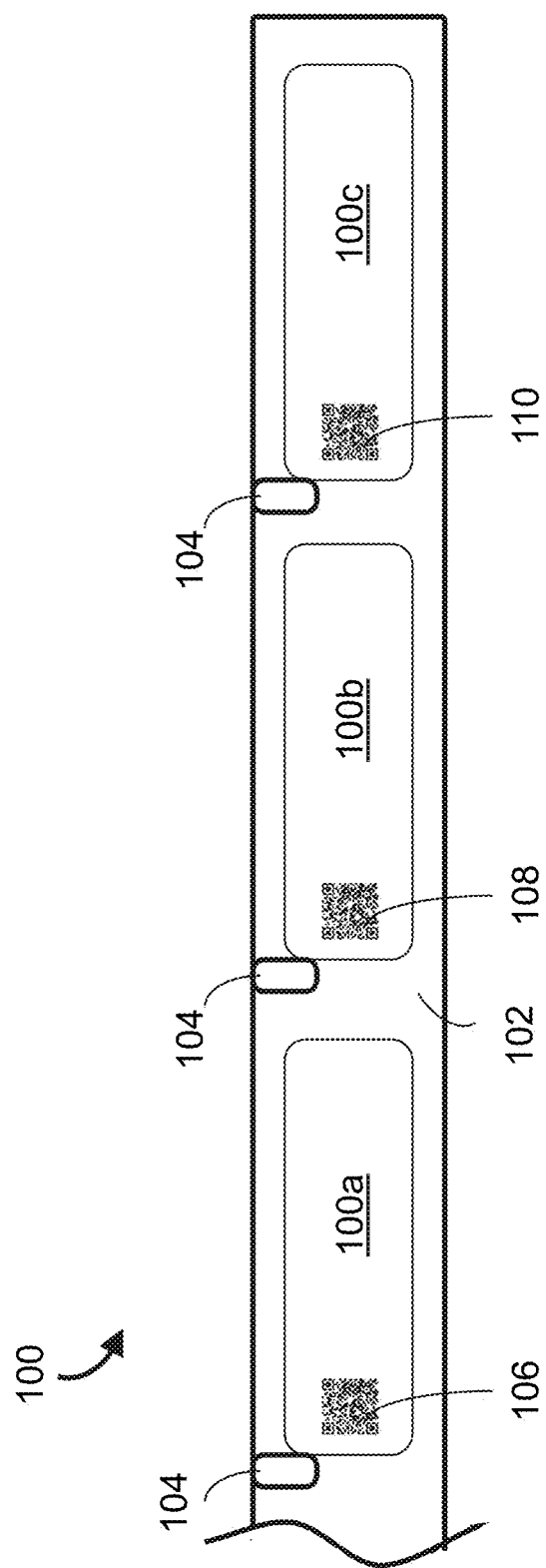
FIG. 1 illustrates a pictorial representation of a plurality of labels according to one embodiment of the present invention.

FIG. 1 illustrates a pictorial representation of a plurality of labels 100 according to one embodiment of the present invention. The plurality of labels 100 includes label 100a, label 100b, and label 100c. The labels 100a-c are affixed to a backing paper 102 using adhesive. The backing paper 102 can include holes 104 or other alignment features, such as notches or marks, for example.

Each label 100a-c is pre-printed with unique pre-printed indicia, such as a 2D barcode image or QR (Quick Response) code 106, 108, 110. In practice, the pre-printed image could alternatively be a one-dimensional barcode or any machine readable image that can represent serial number information. In one embodiment, the QR codes 106, 108, 110 on each successive label 100a-c, respectively, can represent a distinct serial number. The serial numbers can be printed in ascending order on adjacent labels 100a-c. In practice, the QR codes 106, 108, 110 can include other information in addition to the serial number information. For example, the QR codes 106, 108, 110 can include information about the product item (e.g., date of manufacture) or the company that will eventually utilize the labels 100 with their products (not shown).

In one embodiment, the pre-printed QR codes 106, 108, 110 are printed onto a blank label stock as the unique ID "license plate". In one embodiment, the QR codes 106, 108, 110 can be placed in any one of the four corners of the label to leave the remaining print area free for further printing. In practice, the QR codes 106, 108, 110 can be positioned in any suitable location on the labels 100a-c.

In one embodiment, the label is an RFID label. An RFID label is sometimes referred to as a smart label and can include common types of passive RFID tags. RFID labels are generally fabricated from paper or plastic (usually vinyl) and include an embedded RFID inlay. Smart labels usually include adhesive for affixing the label to a package and are used with RFID printers/encoders.

In one embodiment, the serial number information from the labels 100 is stored in a database for future use by a company that affixes the labels 100 to the company's product items.

Figure 2:
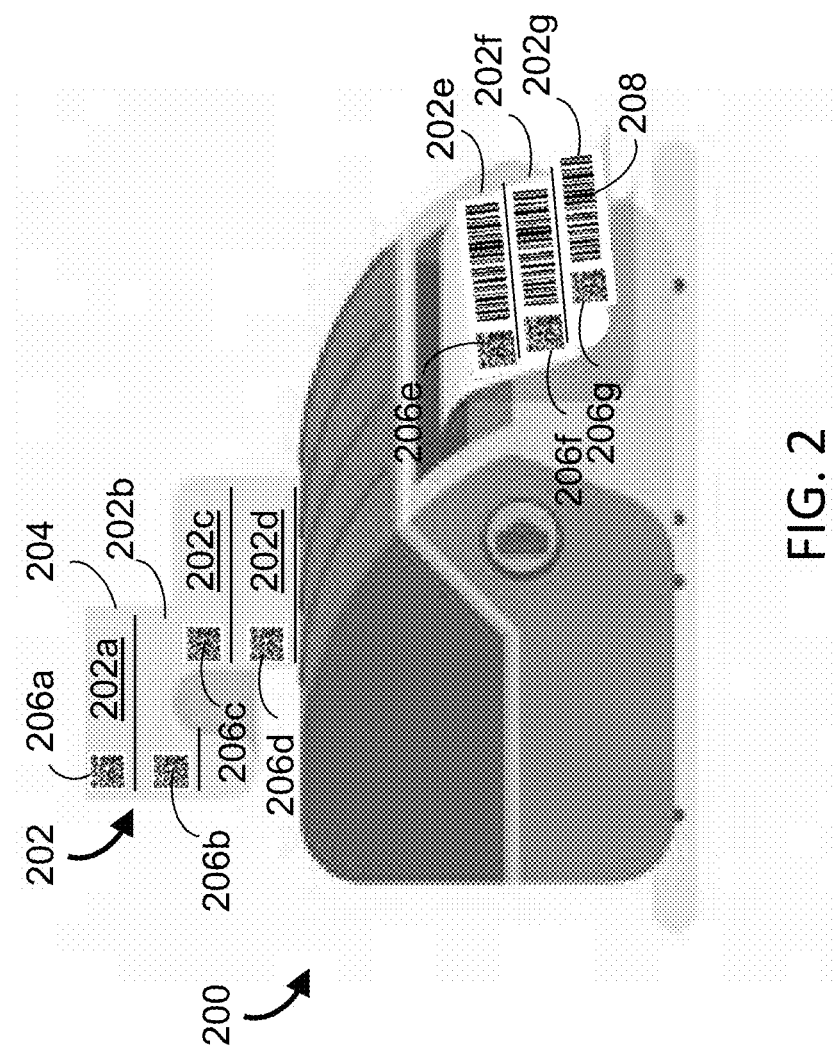
FIG. 2 illustrates a pictorial representation of a printer having a plurality of labels according to one embodiment of the invention.

FIG. 2 illustrates a pictorial representation of a printer 200 having a plurality of labels 202 according to one embodiment of the invention. The plurality of labels 202 is configured in a different format than the plurality of labels 100 of FIG. 1. For example, each label 202a-g in the plurality of labels 202 is affixed to a backing paper 204 so as to be printed in a substantially horizontal direction; whereas each label 100a-c in the plurality of labels 100 (FIG. 1) is affixed to a backing paper 102 so as to be printed in a substantially vertical direction. In practice, the labels 100, 202 can be spooled on rolls, provided in a fanfold configuration or provided in sheet form. Additionally, the backing paper 102, 204 can be fabricated from any suitable material.

The plurality of labels 202 having the pre-printed indicia, such as the QR codes 206a-g become the base label stock used to print an image 208 that includes machine-readable data corresponding to product specific information on the plurality of labels 202. The image 208 can be printed via a standard label printer 200. In one embodiment, the printer 200 is a standard printer that requires no unique encoding functions (e.g., RFID, NFC . . . ). The image 208 representing product specific information can be a 1D (1-dimensional) or 2D (2-dimensional) barcode. This data can include information such as a SKU (Stock Keeping Unit), which can be scanned at check out/point of sale (POS) or to manage inventory.

Once printed with the 1D or 2D barcode data 208, each label 202*a-g* will include both the pre-printed QR codes 206*a-g* as well as the image 208 representing Product ID (SKU). An imaging device (not shown) captures both the QR codes 206*a-g* and the image 208 including the machine-readable data simultaneously or in sequence. A computing device (not shown) creates an association or link between the two captured images. The resulting association creates a unique ID (serialization) link to the product specific ID (SKU). The association can be stored in a memory (not shown). The memory can be locally situated or can be cloud storage, for example. The association allows labeled products to be uniquely identified and inventoried on an individualized basis.

As previously described, the unique serial numbers corresponding to the QR codes printed on the plurality of labels can include sequential values. To improve efficiency, the imaging device can read both the lowest unique serial number and the highest unique serial number printed on the plurality of labels and then software can make an inference as to the remaining serial numbers printed on the plurality of labels.

In one embodiment, the association can also be used to pre-encode and link a radio frequency identification (RFID)-based circuit (not shown). A RFID label (not shown) is created or encoded with a unique serial number. A QR code corresponding to the unique serial number is printed on the RFID label. An image representing a Product ID (SKU) is printed on the RFID label. An imaging device including a RFID reader captures both the pre-printed QR code and the product ID (SKU) and also reads the RFID inlay. A computing device can create an association between the three data points. A software application identifies, tracks, and traces the uniquely tagged item by utilizing the scanned pre-printed barcode data and/or data from the RFID inlay that is read by the RFID reader.

Figure 3:
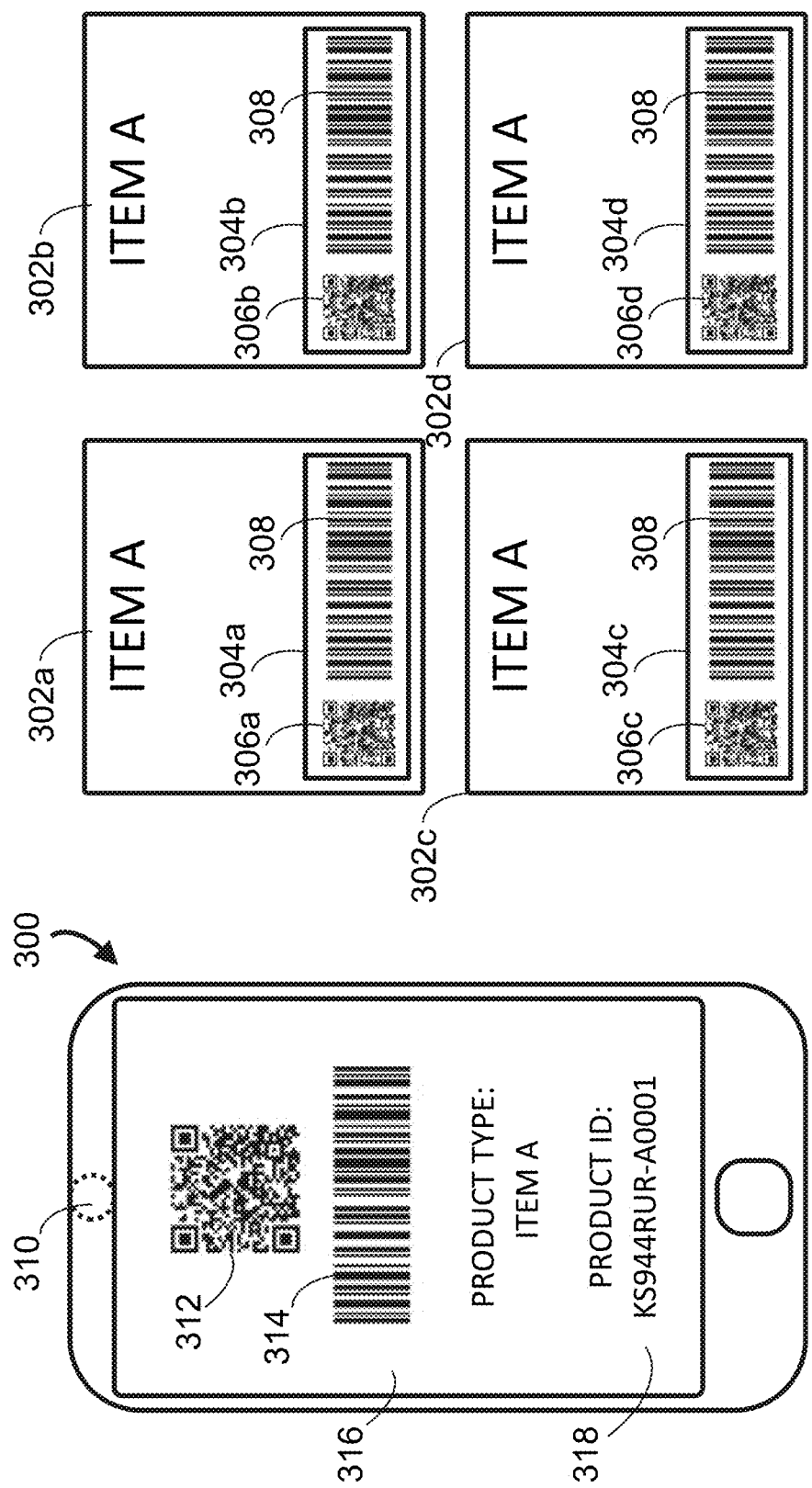
FIG. 3 illustrates a mobile device and four (4) identical products according to the invention.

FIG. 3 illustrates a mobile device 300 and four (4) identical products 302*a-d* according to the invention. Each product 302*a-d* includes a label 304*a-d* having a unique QR code 306*a-d*, respectively. Additionally, each label 304*a-d* includes an identical 1D barcode 308 corresponding to a product type or SKU. The mobile device 300 can be a smart portable cellular telephone (cellphone), tablet or mobile computer, for example.

The mobile device 300 includes an imaging device 310, such as a camera located on the back side of the mobile device 300. The imaging device 310 can have any resolution that is suitable to capture a QR code and a 1D barcode. For example, the imaging device 310 can have a resolution of 2 mega-pixels or above. In practice, any imaging device that is capable of capturing 1D and 2D barcode images can be used.

The mobile device 300 can also include a computer program (software) that executes on the mobile device 300. The software permits a user of the mobile device 300 to capture images of the QR codes 306*a-d* and the 1D barcodes 308 on the labels 304*a-d*.

In operation, a user uses the mobile device 300 to capture an image of a label 304*a* affixed to the product item 302*a*. The software can display the captured images 312, 314 from the label 304*a* on the display 316 of the mobile device 300. In alternate embodiments, the mobile device 300 can capture the QR code 306*a* and the 1D barcode 308 either substantially simultaneously or sequentially. The software can then associate the captured QR code 306*a* with the 1D barcode 308 to create an association 318. The association 318 can be displayed on the display 316.

In one embodiment, the software transmits the images 312, 314 of the captured QR code 306*a* and the 1D barcode 308 to a remote storage device or cloud storage, and software executing on a remote server (not shown) creates the association 318. The association 318 has effectively serialized the product item 302*a* and such information can be stored in a database for tracking products and managing inventory, for example.

Figure 4:
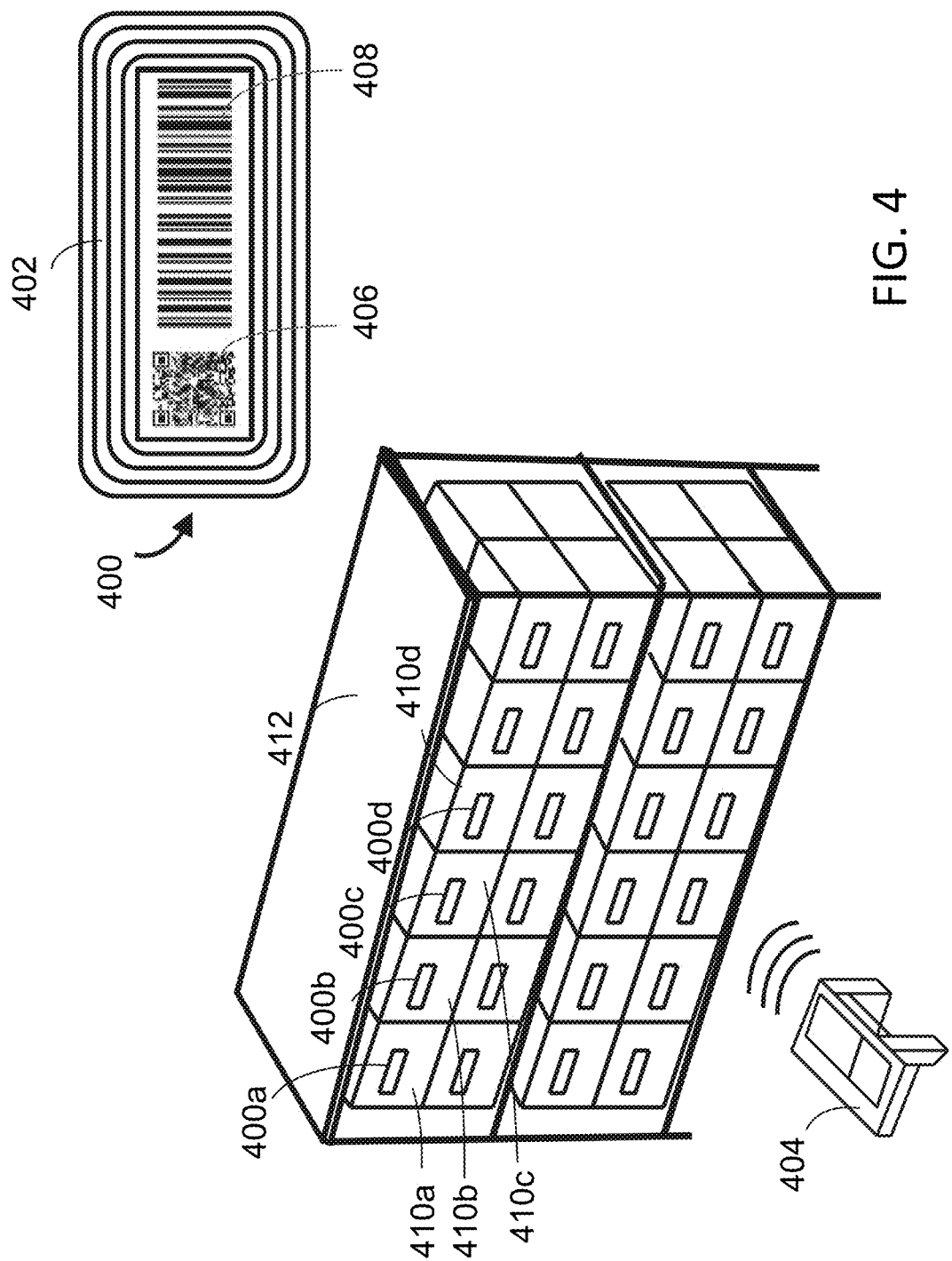
FIG. 4 illustrates a pictorial representation of an RFID label according to the invention.

FIG. 4 illustrates a pictorial representation of an RFID label 400 according to the invention. The RFID label 400 includes an RF circuit 402. The RF circuit 402 is capable of being programmed to transmit data when an RFID reader 404 excites an antenna of the RF circuit 402 with an appropriate frequency. For example, the RF circuit 402 can be an ultra-high frequency (UHF) passive RFID circuit 402. In practice, any suitable RF circuit that operates at a suitable frequency can be used.

Skilled artisans will appreciate that in general, radio-frequency identification (RFID) uses electromagnetic fields to automatically identify and track RFID tags attached to objects. An RFID system consists of a small radio transponder, a radio receiver and transmitter. When triggered by an electromagnetic interrogation pulse from a nearby RFID reader device, the RFID tag transmits digital data, such as an identifying inventory number, back to the RFID reader device. This number can be used to track inventory goods.

Passive RFID tags are powered by energy from the RFID reader's interrogating radio waves exciting the antenna of the RFID tag. Active RFID tags are powered by an on-board battery and thus can be read at a greater range from the RFID reader. The active RFID tag periodically transmits its ID signal. A battery-assisted passive RFID tag has a small battery on board and is activated when in the presence of an RFID reader.

RFID tags can either be read-only, having a factory-assigned serial number that is used as a key into a database, or can be read/write, where object-specific data can be written into the tag using an RFID writing device. Field programmable tags can be write-once, read-multiple times; whereas "blank" tags can be written with an electronic product code by the user.

An RFID tag receives a message from an RFID reader and then responds with its identification and other information. This information can be a unique tag serial number, or can be product-related information such as a stock number, lot or batch number, production date, or other specific information. Since RFID tags can have individual serial numbers, the RFID system can discriminate among several tags that might be within the range of the RFID reader and read them substantially simultaneously. Thus, unlike a barcode, the RFID tag does not need to be within the line of sight of the RFID reader, so it may be embedded in the tracked object.

The RFID label 400 also includes pre-printed indicia, such as a QR code 406. The QR code 406 is preprinted on the label 400 and contains data, such as a serial number corresponding to the data programmed into the RFID circuit 402.

In operation, a user loads a plurality of labels 400 into a standard label printer (not shown), or alternatively, into a label printer having RFID functionality (not shown). The standard label printer can print a 1D barcode 408 on the label 400. A label printer having RFID functionality can not only print the 1D barcode 408, but can also read the RFID circuit 402 to verify that the data contained therein is readable and not corrupted.

The labels 400a-d can be affixed to identical product items 410a-d and read by an imaging device (not shown). In practice, the RFID reader 404 can also include an imaging device (imager) which can be used to capture the labels 400a-d. As previously described, the QR code 406 can be associated with the 1D barcode 408 to create an association. Additionally, the data contained in the RFID circuit 402 is also associated with the 1D barcode 408.

The labeled products 410a-d can then be stored in a shelf system 412. A user can utilize the RFID reader 404 to interrogate the shelf system 412 to determine which products 410a-d are present and which products 410a-d are not present. Thus, the RFID reader 404 enables the tracking of products that were previously only identified by an SKU or as part of a product family. In such cases, there was previously no ability to uniquely inventory or scan each item.

Techniques according to the present invention do not disrupt the process of labeling products with an existing SKU barcode used for point-of-sale transactions. For example, pre-printed labels according to the invention are loaded into a standard label printer for printing the 1D barcode corresponding to the SKU. The SKU is associated with the pre-printed indicia (QR code) on each label as described herein. The invention allows for unique inventory counts and item level product management. In one aspect, the process offers a way for product items to be serialized uniquely.

FIG. 5. illustrates a database table 500 according to the invention. The table 500 is rudimentary in order to better illustrate certain aspects of the invention. In one aspect, column 1 of table 500 illustrates an SKU 502. The SKU 502 corresponds to the product item of interest. The SKU 502 can be represented by a 1D barcode printed on a label. Table 500 illustrates 16 such items associated with the SKU 502.

Column 2 of table 500 illustrates unique serial numbers 504 that can be represented by pre-printed QR codes on a label. The unique serial numbers 504 are linked to the SKU 502 through a software application to create an association 506. The association 506 is shown in column 3 of table 500.

The association 506 can essentially serialize identical product items. A user can manage inventory of the product items when the association 506 is stored in the database table 500. For example, a simple query 508 can determine how many items do not appear in the database table 500. For example, such items may not have had labels affixed to them, or such items may have been misplaced. The serialization of product items enabled by the association 506 allows a user to track and manage items in the database table 500.

Figure 6:
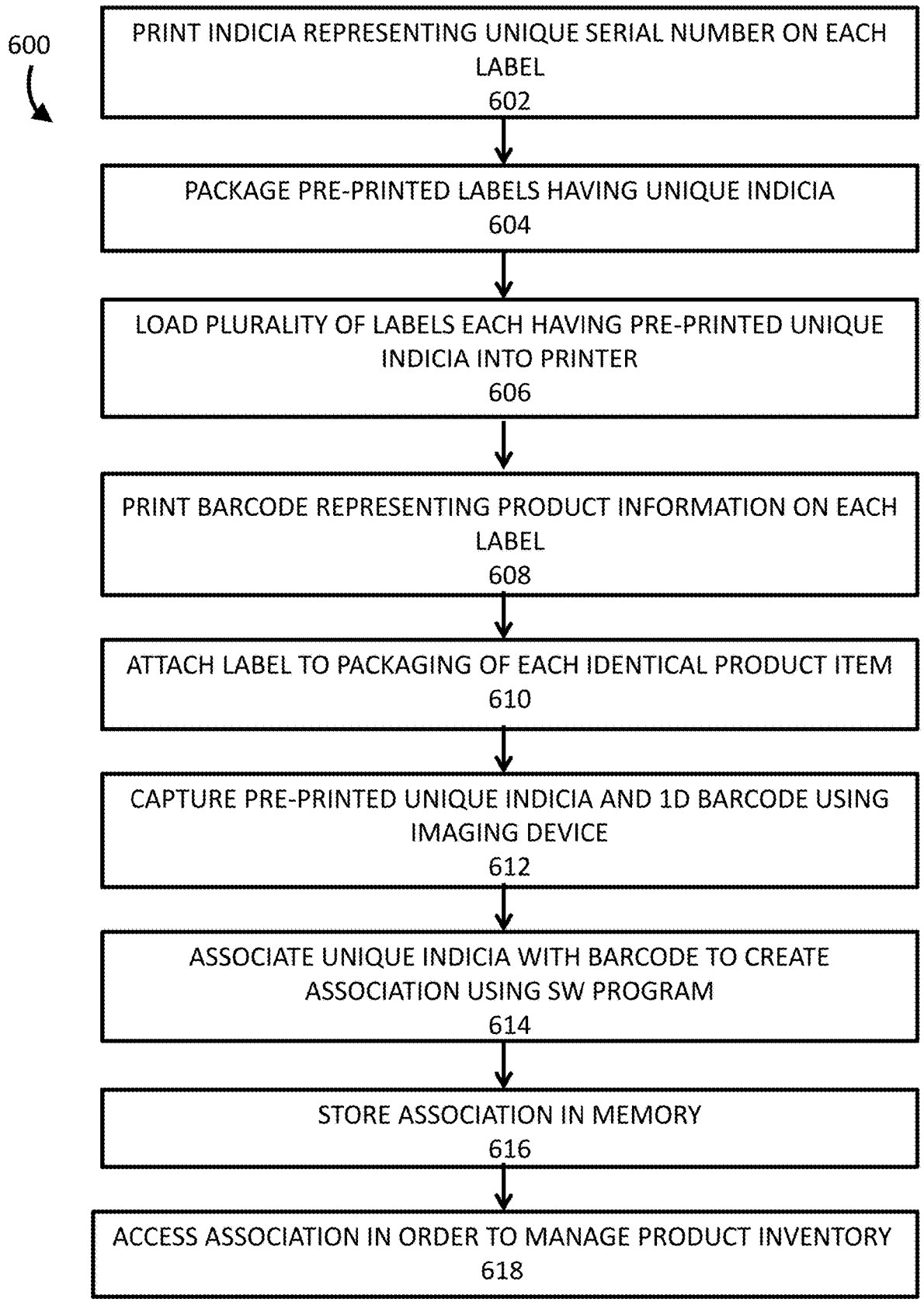
FIG. 6 illustrates a process according to one embodiment of the invention.

FIG. 6 illustrates a process 600 according to one embodiment of the invention. In step 602, an indicia representing a unique serial number is printed on each label of a plurality of blank labels. As previously described, the indicia can be a QR code. In practice, a 1D barcode or other machine readable code could also be used.

In step 604, the plurality of labels having the pre-printed QR codes are packaged for use with product items requiring serialization. For example, the plurality of pre-printed labels could be wound on a roll, or alternatively, could be stored in a fan-fold configuration. In step 606, the pre-printed labels are loaded into a standard label printer. In step 608, the standard label printer prints a 1D barcode on the pre-printed labels. The 1D barcode can correspond to product information, such as a SKU of a product to which the label will eventually be affixed.

In step 610, each label is affixed to the packaging of each identical product. In one embodiment, the label could be glued to the package. In another embodiment, the label could be attached to the product using a small plastic tag fastener. In practice, the label could be attached to the product or the product packaging in any suitable way. In step 612, the pre-printed indicia and the 1D barcode are captured using an imaging device. Any suitable mobile device including an integrated imaging device could be used. For example, the mobile device could be a smart cellular phone or a tablet.

In one embodiment, an imaging device (imager) can capture the pre-printed QR code corresponding to the serial number and other optional product or company information and the 1D barcode corresponding to the SKU of the product. The imaging device can capture the QR code and the 1D barcode (SKU) either substantially simultaneously or sequentially. The captured QR code and 1D barcode (SKU) can be transmitted to a cloud storage or an on-premise storage system.

In step 614, a software program executing on a computer or server associates the pre-printed QR code with the SKU barcode to create an association. The software program can effectively "attach" a serial number to each individual identical product. The resulting data can be used to identify, track, and trace each individual identical product.

In step 616, the association can be stored in a memory. The memory can be in the form of a database. The memory can be local memory or can be remote memory, such as cloud storage. In step 618, a user can access the association to track and manage product inventory.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While at least one example embodiment has been presented in the foregoing detailed description, it should be appreciated that a vast number of variations exist. It should also be appreciated that the example embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

In addition, the section headings included herein are intended to facilitate a review but are not intended to limit the scope of the present invention. Accordingly, the specification and drawings are to be regarded in an illustrative manner and are not intended to limit the scope of the appended claims.

In interpreting the appended claims, it should be understood that:
 a) the word "comprising" does not exclude the presence of other elements or acts than those listed in a given claim;
 b) the word "a" or "an" preceding an element does not exclude the presence of a plurality of such elements;
 c) any reference signs in the claims do not limit their scope;
 d) several "means" may be represented by the same item implemented structure or function;
 e) any of the disclosed devices or portions thereof may be combined together or separated into further portions unless specifically stated otherwise; and
 f) no specific sequence of acts or steps is intended to be required unless specifically indicated.

What is claimed is:

1. A method, comprising:
 loading a plurality of labels into a printer, each of the labels having a unique serial number pre-printed thereon, each of the plurality of labels further comprising a radio frequency identification (RFID) circuit for storing the unique serial number;
 printing machine-readable data corresponding to product information on the plurality of labels, such that the machine-readable data is printed on a same side of each of the plurality of labels as the unique serial number;
 attaching each of the plurality of labels to an individual product item to create a plurality of serialized product items;
 reading the machine-readable data and the unique serial number on each label of the plurality of labels with an imaging device coupled to a computing device;
 reading the unique serial number stored in each radio frequency identification (RFID) circuit with an RFID reader coupled to the computing device;
 associating the machine-readable data with each of the plurality of unique serial numbers to create a plurality of associations;
 storing the plurality of associations in a memory; and
 determining which individual product item of the plurality of serialized product items is absent from the memory by analyzing the plurality of associations stored in the memory.

2. The method of claim 1, wherein the imaging device reads the machine-readable data and each of the plurality of unique serial numbers substantially simultaneously.

3. The method of claim 1, further comprising managing the individual product item with the stored association of the machine-readable data and the unique serial number.

4. The method of claim 1, further comprising determining an inventory status of the individual product item with the association.

5. The method of claim 1, wherein the memory comprises a database.

6. The method of claim 1, wherein the machine-readable data comprises a product identifier for the product.

7. The method of claim 1, wherein each unique serial number is represented by a unique indicia.

8. The method of claim 7, wherein the unique indicia comprise a quick response (QR) code.

9. The method of claim 1, wherein the radio frequency identification (RFID) circuit comprises one of a Near-Field Communication (NFC) circuit and an Ultra High Frequency (UHF) circuit.

10. The method of claim 1, wherein the unique serial numbers of the plurality of labels comprise sequential values.

11. The method of claim 10, further comprising reading both the lowest unique serial number and the highest unique serial number of the plurality of labels and inferring the remaining serial numbers of the plurality of labels.

12. An apparatus for managing inventory, comprising:
 a plurality of labels each having a unique serial number pre-printed thereon, each of the plurality of labels further comprising a radio frequency identification (RFID) circuit for storing the unique serial number;
 a printer for printing machine-readable data corresponding to product information on each of the plurality of labels for attachment to an individual product item to create a plurality of serialized product items, the machine-readable data being printed on a same side of each of the plurality of labels as the unique serial number;
 an imaging device reading the machine-readable data;
 an RFID reader reading the unique serial number stored in the radio frequency identification (RFID) circuit;

a computing device coupled to the imaging device and the RFID reader, software executing on the computing device associating the machine-readable data with each of the plurality of unique serial numbers to create a plurality of associations;

a memory for storing the plurality of associations; and a tracking system for determining which individual product item of the plurality of serialized product items is absent from the memory by analyzing the plurality of associations stored in the memory.

13. The apparatus of claim 12, wherein the imaging device reads the machine-readable data and each of the plurality of unique serial numbers.

14. The apparatus of claim 12, wherein the memory comprises cloud storage.

15. The apparatus of claim 12, wherein the machine-readable data comprises an identifier for the individual product item.

16. The apparatus of claim 12, wherein each unique serial number is represented by a unique indicia.

17. The apparatus of claim 12, wherein the radio frequency identification (RFID) circuit comprises one of a Near-Field Communication (NFC) circuit and an Ultra High Frequency (UHF) circuit.

\* \* \* \* \*